（12） United States Patent
Gruet et al.

(10) Patent No.: US 9,750,058 B2
(45) Date of Patent: Aug. 29, 2017

(54) DIRECT MODE COMMUNICATION IN A WIDEBAND RADIO COMMUNICATION SYSTEM

(71) Applicant: AIRBUS DS SAS, Elancourt (FR)

(72) Inventors: Christophe Gruet, Montigny le Bretonneux (FR); Gérard Marque-Pucheu, Verneuil (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 14/649,395

(22) PCT Filed: Nov. 29, 2013

(86) PCT No.: PCT/FR2013/000315
§ 371 (c)(1),
(2) Date: Aug. 6, 2015

(87) PCT Pub. No.: WO2014/087057
PCT Pub. Date: Jun. 12, 2014

(65) Prior Publication Data
US 2015/0341972 A1   Nov. 26, 2015

(30) Foreign Application Priority Data
Dec. 3, 2012   (FR) ..................................... 12 03275

(51) Int. Cl.
*H04W 76/00*   (2009.01)
*H04W 4/08*   (2009.01)
(Continued)

(52) U.S. Cl.
CPC ........... *H04W 76/002* (2013.01); *H04W 4/08* (2013.01); *H04W 72/087* (2013.01); *H04W 76/023* (2013.01); *H04W 4/06* (2013.01)

(58) Field of Classification Search
CPC ... H04W 76/002; H04W 4/08; H04W 72/087; H04W 76/023
(Continued)

(56) References Cited

U.S. PATENT DOCUMENTS 8,903,930 B2 * 12/2014 Park ....................... H04W 4/08
709/206
2005/0254449 A1   11/2005 Halfmann et al.
(Continued)

FOREIGN PATENT DOCUMENTS

WO   WO 2010/049801 A1   5/2010
WO   WO 2011/109941 A1   9/2011
WO   WO 2012/088470 A1   6/2012

OTHER PUBLICATIONS

International Search Report as issued in International Patent Application No. PCT/FR2013/000315, dated Jan. 29, 2014.

*Primary Examiner* — Ronald B Abelson
(74) *Attorney, Agent, or Firm* — Pillsbury Winthrop Shaw Pittman LLP

(57) ABSTRACT

A method for setting a direct mode communication channel of a group of terminals in a wide band radiocommunication system, the setting of the channel being assisted by at least one base station at which terminals of the group are recorded, the method including transmitting a setting request to the base station by a terminal of the group recorded at said base station, setting a direct mode communication channel by the base station by allocating free resource blocks, transmitting a setting message by the base station to the terminals, and accessing direct mode communication channel by each of said terminals for directly communicating with the other terminals of the group.

22 Claims, 6 Drawing Sheets

(51) Int. Cl.
*H04W 72/08* (2009.01)
*H04W 76/02* (2009.01)
*H04W 4/06* (2009.01)

(58) Field of Classification Search
USPC .......................................................... 370/329
See application file for complete search history.

(56) References Cited

U.S. PATENT DOCUMENTS

2006/0165035 A1    7/2006  Chandra et al.
2014/0003320 A1*   1/2014  Etemad ................... H04W 4/06
                                                  370/312

* cited by examiner

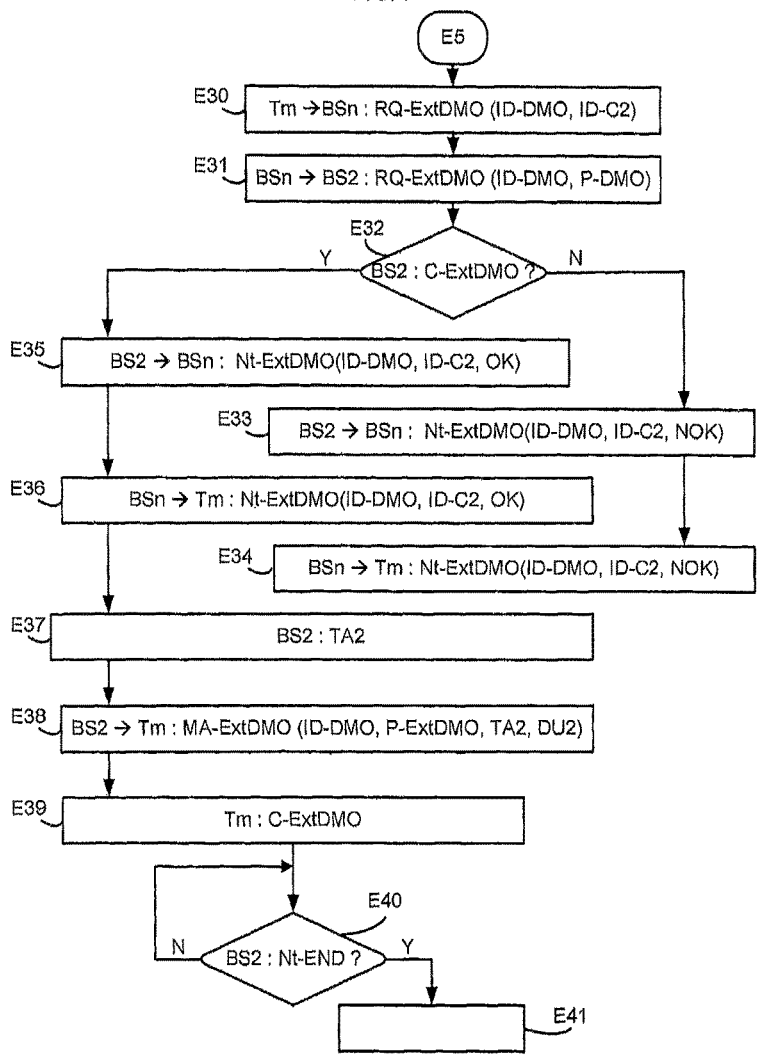

DIRECT MODE COMMUNICATION IN A WIDEBAND RADIO COMMUNICATION SYSTEM

CROSS-REFERENCE TO RELATED APPLICATIONS

This is the U.S. National Stage of PCT/FR2013/000315, filed Nov. 29, 2013, which in turn claims priority to French Patent Application No. 1203275, filed Dec. 3, 2012, the entire contents of all applications are incorporated herein by reference in their entireties.

TECHNICAL FIELD OF THE INVENTION

The present invention generally relates to the field of direct mode radiocommunication. More particularly, the invention relates to setting a direct mode communication in a wide band radiocommunication system. The invention is in particular applicable in PMR (Professional Mobile Radio) professional radiocommunication systems during interventions of security professionals such as firemen, police or even army force in zones out of radio coverage.

State of the Art and Technical Problems to be Solved

Generally, a direct mode communication is a communication between radiocommunications devices, such as mobile terminals, without using a radio infrastructure. The reach is however restricted to a few hundred meters or even some kilometers.

In narrow band radiocommunications systems, for example of the TETRA or TETRAPOLE technology, radio resources are reserved for the direct mode communication between mobile terminals. The other radio resources are used for relayed communications, that is communications between mobile terminals passing through the network infrastructure.

The PMR shared resources radiocommunication systems are differentiated from the mobile telephony public systems such as GSM or UMTS above all by the quick communication setting, the group calls, priority calls, end-to-end encryption and possibility of directly connecting two mobile stations without passing through a base station (direct mode).

Nowadays, wide band radiocommunication networks quickly change and have been established in the private radiocommunication world. Unlike narrow band radiocommunication systems, the wide band radiocommunication systems have a management of resources which are shared by all the cells of the system. That is why it is difficult to reserve wide band resources for direct mode communications. Then, there is, for the purpose of providing the same PMR communication functions as the narrow band systems, a need to implement direct mode communications in a wide band radiocommunication system.

Disclosure of the Invention

One object of the invention is to overcome the drawbacks of prior art by providing a method for setting a direct mode communication in a wide band radiocommunication system and the system implementing said method according to any of claims 1 to 18.

Thus, the object of the invention is a method for setting a direct mode communication for terminals of a given direct mode communication group in at least one current cell of a wide band radiocommunication system comprising a plurality of cells, each cell of the system comprising a base station, the method comprising the following steps:

transmitting a request for setting a direct mode communication channel to the current base station of the current cell by a terminal of the group recorded at said base station, the request comprising an identity of the group and quality of service parameters specific to the requested direct mode communication, after receiving the request by the current base station, setting a direct mode communication channel by allocating free resource blocks selected from a set of resource blocks allocated to the current cell, as a function of the quality of service parameters, transmitting a channel setting message, transmitted by the current base station to the terminals recorded at said current base station, the message comprising the identity of the group and setting parameters of the channel set, and after receiving the setting message by the terminals of the group which are recorded with the current base station, accessing by each of said terminals to the direct mode communication channel from the setting parameters transmitted for directly communicating with said other terminals of the group.

The method enables a direct mode communication to be set between terminals of a same communication group which are recorded at the current base station in a wide band communication system. In this method, it is the base station which allocates resource blocks to set a channel allowing the direct mode communication access. Once the channel is set, the base station no longer intervenes in the direct communication. The terminals directly communicate with each other via the channel without passing through the network infrastructure. The base station can observe exchanges in the DMO channel, thus allowing for example the management of billing and checking a legitimate use of the channel allocated.

According to another characteristic, the method comprises after setting the direct mode communication channel:

determining a timing advance, value by the current base station as a function of at least one time datum, and transmitting the timing advance value determined via the setting message of a direct mode communication channel to the terminals of the group which are recorded at the current base station for said terminals to be synchronized with each other.

The timing advance value determined enables the terminals of the group which are recorded at the base station to directly communicate with each other in direct mode without creating a communication collision with other communications set in the current cell.

According to another characteristic, the method comprises after setting the direct mode communication channel in the current cell, transmitting a request for setting a channel extension of the direct mode communication channel to at least one neighbouring base station of a neighbouring cell. The setting of a channel extension enables terminals of the group which are recorded or about to be recorded at a neighbouring cell of the current cell to access the ongoing direct mode communication in the current cell.

One object of the invention is also a base station of a cell of a wide band radiocommunication system, the system comprising a plurality of cells each comprising a base station, and at least one terminal of a given direct mode communication group being recorded at the base station, the base station comprising:

a means for receiving a request for setting a direct mode communication channel transmitted by the terminal at the base station, the request comprising an identity of the group and the quality of service parameters specific to the direct mode communication requested, a means for setting a direct mode communication channel by allocating free resource blocks selected from a set of resource blocks allocated to the cell, as a function of the quality of service parameters, a means for transmitting a setting message of the channel to the terminals recorded at the base station, the message comprising the identity of the group and setting parameters of the channel formed, the message being transmitted for each terminal of the group recorded at the base station to access the direct mode communication channel from the setting parameters for directly communicating with said other terminals of the group, the means of the base station implementing the steps of the method for setting a direct mode communication according to one of the claims of the method.

One object of the invention is also a terminal belonging to a given direct mode communication group and recorded at a base station of a cell of a wide band radiocommunication system, the system comprising a plurality of cells each comprising a base station, the terminal comprising:

a means for transmitting a request for setting a direct mode communication channel to the base station, the request comprising an identity of the group and quality of service parameters specific to the direct mode communication requested, the request being transmitted for the base station to set a direct mode communication channel by allocating free resource blocks selected from a set of resource blocks allocated to the current cell, as a function of the quality of service parameters, a means for receiving a setting message of the channel from the base station, the message comprising the identity of the group and setting parameters of the channel set, and a means for accessing the direct mode communication channel from the setting parameters transmitted for directly communicating with said other terminals of the group;

the means of the terminal implementing steps of the method for setting a direct mode communication according to one of the claims of the method.

BRIEF DESCRIPTION OF THE FIGURES

The invention will be better understood upon reading the description that follows and upon examining the accompanying figures. Those are only shown by way of an illustration and in no way limiting to the invention. The figures show:

FIG. 7: a functional diagram representing a second embodiment of setting a direct mode communication extension in a neighbouring cell when a terminal moves from a first cell to the neighbouring cell.

DESCRIPTION OF THE INVENTION

It will now be noted that the figures are not drawn to scale.

The following embodiments are exemplary. Even though the description refers to one or more embodiments, this does not necessarily mean that each reference relates to the same embodiment, or that the characteristics are only applicable to a single embodiment. Simple characteristics of different embodiments could also be combined to provide other embodiments.

Figure 1:
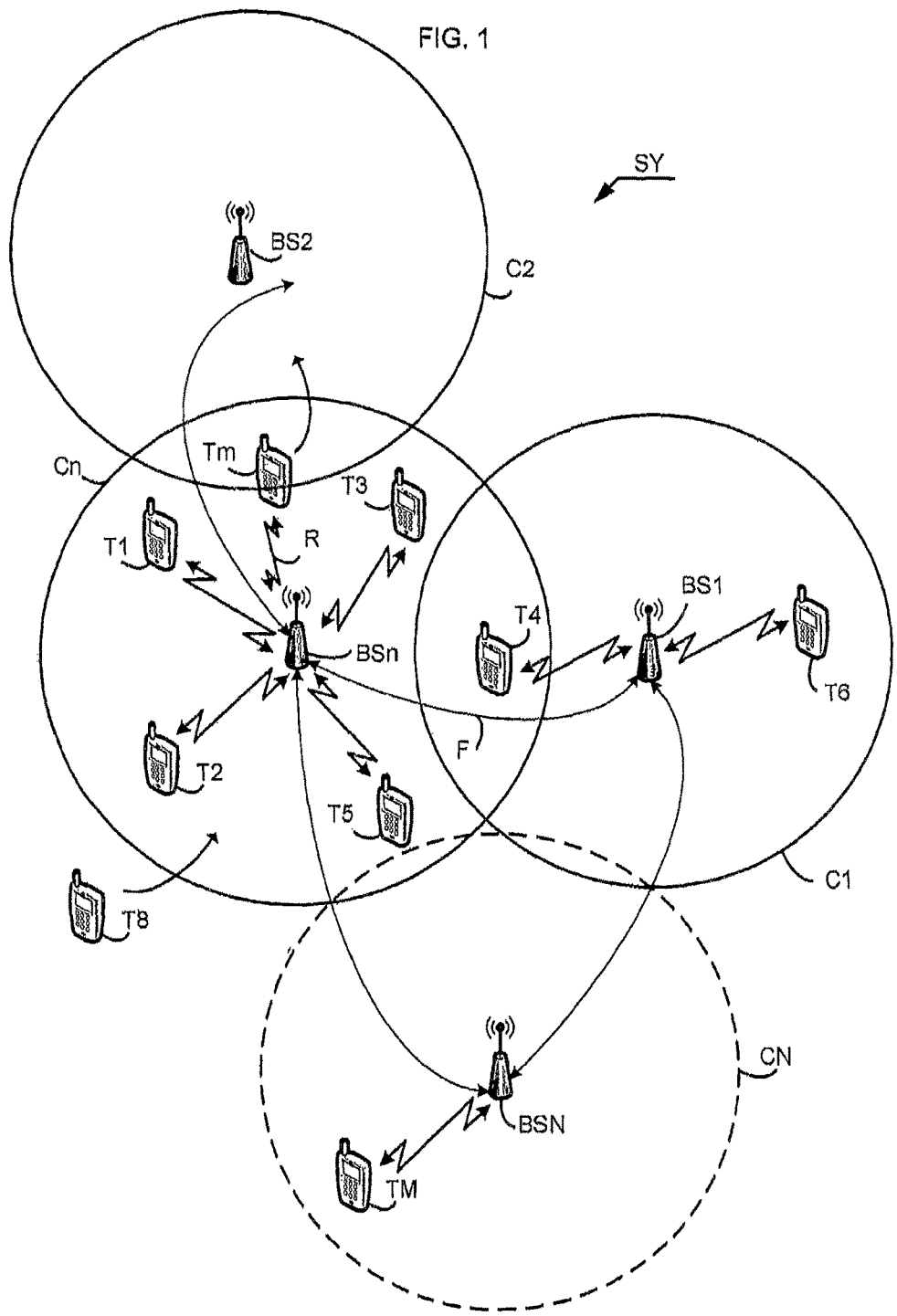
FIG. 1: a schematic representation of a radiocommunication system according to the invention.

FIG. 1 represents a radiocommunication system SY according to the invention. The radiocommunication system of the invention is a wide band radiocommunication network, for example of the WIMAX (Worldwide Interoperability for Microwave Access) type relying on an Air interface according to the standard IEEE 802.16, more particularly according to the standard 802.16m, or of the LTE (Long Term Evolution) type which has wide frequency bands each typically higher than 1 MHz, for example of 1.4 MHz, 3 MHz, 5 MHz, 10 MHz or 20 MHz.

The radiocommunication system SY comprises cells C1-CN each comprising a base station BSn and terminals Tm related to the base station, with indexes n and m between $1 \leq n \leq N$ and $1 \leq m \leq M$, N and M being integers. By terminal Tm related to the base station, it is meant a terminal which has been recorded at the base station to emit and receive communications to and from the base station.

A base station BSn of a cell Cn is able to communicate with a terminal Tm of the cell Cn through a radio channel R of a wide band radiocommunication network. A base station is also able to communicate with other base stations of the system SY through a wire channel F, for example of the X2 type in LTE technology. In LTE technology, the base station is called eNodeB.

Figure 2:
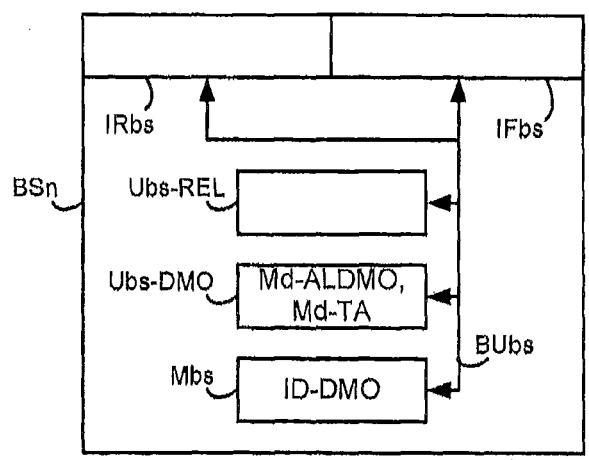
FIG. 2: a block diagram representative of a base station of the radiocommunication system according to the invention.

FIG. 2 represents, in more detail, a base station BSn according to the invention. The base station comprises a radiocommunication interface IRbs, a wire communication interface IFbs, a relayed mode processing unit Ubs-REL, a direct mode processing unit Ubs-DMO and a set of memories Mbs. The entities IRbs, IFbs, Ubs-REL, Ubs-DMO and Mbs are connected to each other by a bidirectional bus BUbs.

The relayed mode processing unit Ubs-REL includes for example one or more processors controlling the setting and management of a relayed mode communication according to a known method. A further description of this unit is useless.

The direct mode processing unit Ubs-DMO includes for example one or more processors controlling a module Md-ALDMO for allocating resources for a direct mode communication, a module Md-TA for determining a timing advance.

The radiocommunication interface IRbs transmits and receives messages, notifications from/to the terminals of the cell through radiocommunication channels.

The wire communication interface IFbs transmits and receives messages, notifications from/to the neighbouring base stations of the radiocommunication system.

The set of memories Mbs is a recording medium wherein programs can be saved. It comprises volatile and/or non-volatile memories such as EEPROM, ROM, PROM, RAM, DRAM, SRAM memories, etc. The algorithm implementing the steps of the method for setting a direct mode communication carried out in the base station is stored in the Mbs.

In reference to FIG. 1, a terminal Tm can be for example a telephone (Smartphone), a tablet, a USB key-modem or any other stationary or mobile equipment (GPS, computer, video screen, A terminal Tm is able to communicate with the base station BSn to which it is related through a wide band radiocommunication network. A terminal is able to communicate in relayed mode with other terminals of the cell or other terminals of other cells of the system SY. By communication in relayed mode, it is meant a data exchange from a transmitting terminal to another receiving terminal or a group of receiving terminals through the infrastructure of the radiocommunication network. The communications between terminals pass through the base stations of the network infrastructure to which the terminals are related. According to the invention, a terminal Tm of a cell is also able to communicate in direct mode with other terminals of the cell or adjacent cells, also called neighbouring cells. By communication in direct mode, it is meant a data exchange from a transmitting terminal to another receiving terminal or a group of receiving terminals without passing through the infrastructure of the radiocommunication network, therefore without passing through the base station.

Figure 3:
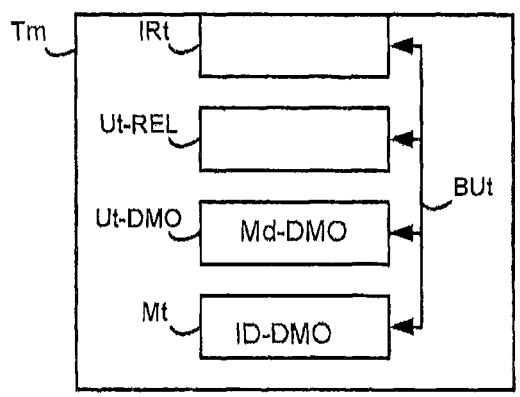
FIG. 3: a block diagram representative of a user terminal of the radiocommunication system according to the invention.

FIG. 3 represents in more detail a terminal Tm according to the invention. The terminal comprises a radiocommunication interface IRt, a processing unit Ut-REL of a relayed mode communication, a processing unit Ut-DMO of a direct mode communication and a set of memories Mt. The entities IRt, Ut-REL, Ut-DMO and Mt are connected to each other by a bidirectional bus BUt.

A processing unit Ut-REL includes for example one or more processors controlling the management of the communications in relayed mode. A further description of this unit is useless.

The processing unit Ut-DMO includes for example one or more processors controlling a module Md-DMO for managing direct mode communications.

The radiocommunication interface IRt enables messages, notifications to be transmitted and received from/to the base station and/or terminals of the same cell.

The set of memories Mt is a recorded medium wherein programs can be saved. It comprises volatile and/or non-volatile memories such as EEPROM, ROM, PROM, RAM, DRAM, SRAM memories, etc. The algorithm implementing the steps of the method for setting a direct mode communication carried out in terminal Tm is stored in Mt.

The terminals of a same cell communicate with the base station of the cell through the radiocommunication channels. In wide band technology, a communication channel is formed by one or more resource blocks. By resource blocks, it is meant a frequency block consisting of several frequency subcarriers during a time window, called a time step. The time window consists of several symbol times for the purpose of the OFDM modulation. The frequency band of the wide band radiocommunication network is divided into several frequency blocks shared between the cells of the system SY according to a known resource allocation method, such as a frequency reuse according to a specific factor for example a factor 1, or such that a reuse of fractional frequency. To each cell is/are allocated one or several frequency blocks each comprising a resource block per time step.

In relayed mode, the communication channels allocated to a cell are divided into two types of communication channels: the uplink communication channels and the downlink communication channels. An uplink communication channel enables a communication from a terminal of the cell to the base station. A downlink communication channel enables a communication from the base station to a terminal or a group of terminals of the cell.

The uplink or downlink communication channels, each formed by one or more resource blocks, comprise control channels and transport channels. The control channels comprise control data which are for example synchronization data between a terminal and a base station, system information data, resource allocation data. The downlink communication control channels are accessible by all the terminals of the cell. The uplink communication control channels are accessible by the base station. The transport channels enable the transport of signalling data such as the recipient's identity, communication modulation, and transport of traffic data, such as voice data, multimedia data. Uplink or downlink communication transport channels are selected and allocated by the base station as function of communication requests sent by the transmitting terminals. The traffic data of transport channels are only accessible to one or more specific terminals forming for example a communication group.

To set a relayed mode communication between terminals of the cell, the unit Ubs-REL of the base station allocates, according to a known implementation, an uplink transport channel associated with a downlink transport channel. A further description of the known setting of a relayed mode communication is useless.

To communicate in direct mode, a group of terminals of a same cell use a transport channel, called DMO channel, selected by the base station from all the uplink or downlink transport channels. Then, the terminals directly exchange with each other through this DMO channel without passing through the base station.

To set or change the DMO channel, the base station and the terminals of the cell exchange information through an uplink control channel and a downlink control channel which are dedicated to the direct mode. These channels are respectively called in the following description uplink DMO control channel and downlink DMO control channel. The downlink DMO control channel corresponds, for example in LTE technology, to RRC (Radio Resource Control) type messages forwarded via a physical uplink shared channel (P-USCH).

The DMO downlink channel corresponds, for example in LTE technology, to an SIB (System Information Block) message type dedicated to the DMO among a set of SIB message types relating to system information. The SIB messages dedicated to the DMO are forwarded via a physical downlink share channel (PDSCH).

Figure 4:
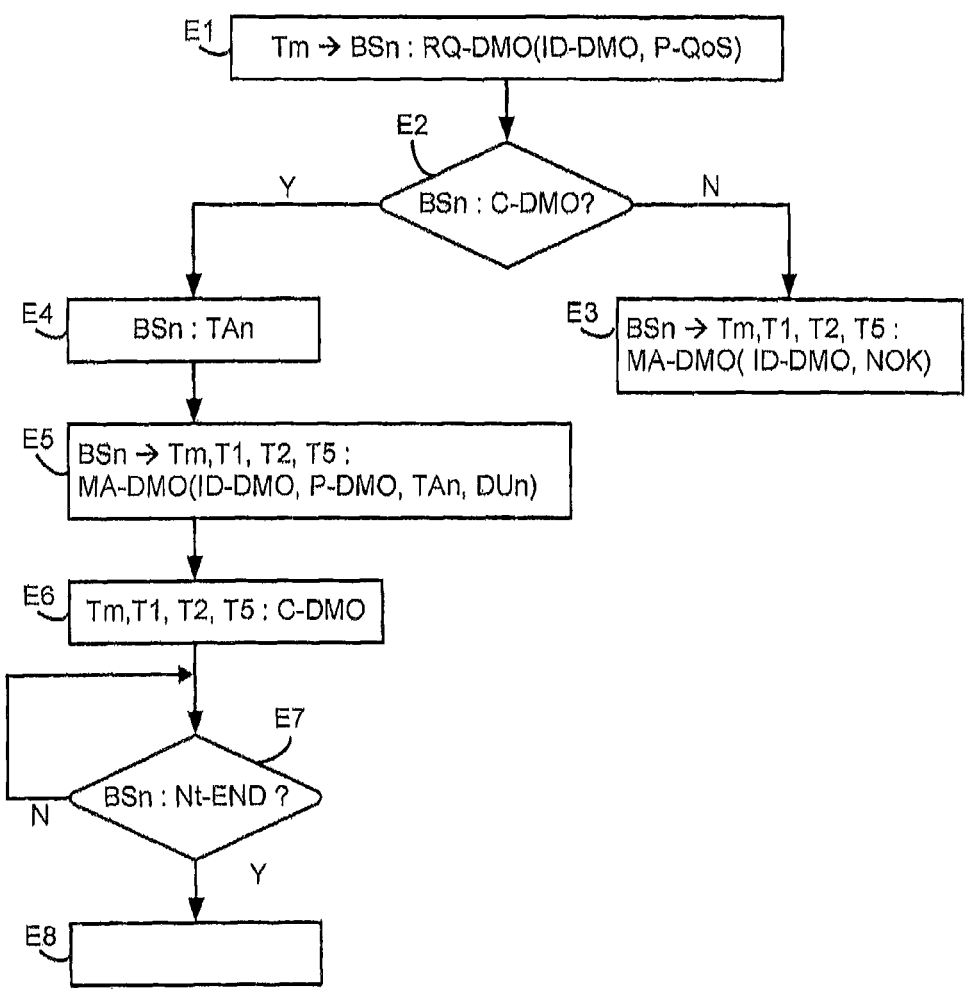
FIG. 4: a functional diagram of a setting method assisted by a direct mode communication in a cell of the radiocommunication system according to the invention.

The functional diagram illustrated in FIG. 4 represents steps of the method for setting a DMO channel in one of the cells of the system. More particularly, the method is described from an example of setting a direct mode communication in a cell Cn requested by the terminal Tm for the group of direct mode communication Tm, T1, T2, T4, T5 and T8. In the following description a direct mode communication group will be called a DMO group. Initially, the terminals Tm, T1, T2 and T5 of the cell Cn are recorded at the base station BSn. The terminal T8 is not yet in the cell Cn. The terminal T4 of the cell C1 is recorded at the base station BS1. By terminal recorded at a base station, it is meant a terminal which can transmit control data to the base station via uplink control channels and the base station which can transmit to all the terminals recorded at the same control data via downlink control channels.

Steps E1 to E7 describe setting the DMO channel in the cell Cn for the terminals Tm, T1, T2 and T5 of the DMO group.

In step E1, the user of the terminal Tm wishes to initiate a direct mode communication DMO with the DMO group consisting of the terminals Tm, T1, T2, T4, T5 and T8. Alternatively, the terminal Tm is designated by all the terminals of the DMO group to request setting of the DMO communication. To initiate the DMO communication, the module Md-DMO of the terminal Tm forms a request RQ-DMO for setting a DMO channel. The interface IRt of the terminal Tm transmits to the base station BSn the request RQ-DMO through the uplink DMO control channel. The request RQ-DMO comprises an identity ID-DMO of the DMO group, quality of service parameters P-QoS specific to the required communication.

The identity ID-DMO is stored in a memory Mbs of each base station of the radiocommunication system SY. The identity ID-DMO is also stored in a memory Mt in each terminal Tm, T1, T2, T4, T5 and T8 of the DMO group. The identity ID-DMO is associated in the memory of the base station with identifiers of the terminals Tm, T1, T2, T4, T5 and T8 of the DMO group. A terminal identifier is for example the IMSI (International Mobile Subscriber Identity) identity relating to the terminal user or IMEI (International Mobile Equipment Identity) identity of the terminal. A memory of the base station can comprise several identities of the DMO group corresponding to several different DMO groups. Furthermore, a memory of each terminal can comprise several identities of the DMO group corresponding to several different DMO groups with the terminal is a member of. Alternatively, the identity ID-DMO is associated beforehand with identifiers of the terminals of the DMO group in a database of the network, for example a HSS database in LTE technology. In this alternative, after receiving the allocation request RQ-DMO, the base station stores the identity ID-DMO in one of the memories Mbs and requests the database of the network to transmit to it the identifiers of the terminals of the DMO group associated with the identity ID-DMO to then associate them to the identity ID-DMO stored.

The quality of service parameters P-QoS indicate the type of data which will be transmitted in the DMO channel (voice data or multimedia data), the modulation required in the channel, the data transmission rate and the channel allocation duration required.

Then in step E2, the interface IRbs of the base station BSn receives the request RQ-DMO. The Md-ALDMO module of the base station selects from the free resource blocks allocated to the cell those corresponding to the quality of service parameters P-QoS required to set the channel C-DMO. By free resource blocks, it is meant blocks not used for ongoing relayed communications in the cell Cn or for ongoing direct mode communications in the cell Cn.

During this step, the Md-ALDMO module can detect a radio overload of the cell, that is most of the resource blocks are used both for other relayed mode and direct mode communications. From this detection, the Md-ALDMO module can only set an undersized DMO channel not exactly corresponding to the quality of service parameters requested by the terminal which has emitted the request RQ-DMO. The allocation of an undersized DMO channel by the base station for a group of terminals has the advantage of allowing at least one minimum transmission of the communication, for example a transmission of sound data, in particular during emergency interventions of a group of security professionals on a site.

If in step E2, no resource block is free or the number of resource blocks is not enough to set a DMO channel even if it is undersized (N), the module Md-ALDMO cannot set the channel C-DMO. Then in step E3, the interface IRbs of the station BSn transmits via the downlink DMO control channel to the terminals of the cell Cn and in particular to the terminals of the groups Tm, T1, T2 and T5 a message MA-DMO for setting a channel containing the identity of the ID-DMO group and a NOK information indicating that the channel C-DMO cannot be set. Alternatively, to notify that the channel C-DMO could not be set, the base station transmits parameters P-DMO for setting a zero-value DMO channel.

If in step E2, the base station has allocated enough resource blocks to form the normal size or undersized channel C-DMO (Y), the module Md-TA of the base station BSn determines a timing advance TAn value in step E4. The TAn value is determined as a function of time data from one or more terminal(s) of the DMO group related to the base station BSn. The timing advance value corresponds to the time of travel of a signal from a terminal to the base station. Implementations of determining the timing advance value are described subsequently in the description. The timing advance value TAn is stored in one of the memories of the base station. The timing advance value TAn will be sent to all the terminals Tm, T1, T2, T5 of the identified group ID-DMO recorded in the cell Cn in order to improve their direct transmission and avoid any collision with the transport channels allocated to other communications. Indeed, the resource blocks forming transport channels allocated to other communications in the cell Cn can be adjacent to the resource blocks forming the channel C-DMO allocated to the DMO group.

Then in step E5, the unit Ubs-DMO of the base station BSn set a message MA-DMO for setting a channel C-DMO. The interface IRbs broadcasts to all the terminals Tm, T1, T2, T5 of the group DMO which are present in the cell Cn the message MA-DMO through the downlink DMO control channel. The message MA-DMO comprises parameters P-DMO of the channel C-DMO. The parameters P-DMO can be the frequency block(s) and time steps defining the resource blocks forming the DMO channel, as well as the modulation of the DMO channel. The message MA-DMO also comprises the identity of the ID-DMO group and the timing advance value TAn determined. The message MA-DMO can also comprise a utilization period DUn of the channel C-DMO by the group. The period DUn is determined by the base station BSn and represents for example the available time of the resource blocks forming the channel C-DMO before being used for other communications.

Then in step E6, each interface IRt of a terminal Tm, T1, T2, T5 of the DMO group receives the message MA-DMO. When a channel C-DMO has been set, the module Md-DMO of each terminal applies the parameters P-DMO in order to access said channel and to directly communicate with the other terminals of the group. The module Md-DMO of each terminal also applies the timing advance value TAn so that each terminal can be synchronized with other resource blocks allocated to the channel C-DMO without creating collision with adjacent blocks dedicated to other communications. During the direct mode communication, exchanges between terminals of the group are conventional direct exchanges. The base station does not normally intervene in these exchanges. The conventional direct exchanges between the terminals and the DMO group will not be further developed.

If the parameters P-DMO define an undersized DMO channel, each terminal can adapt to the allocation and transmit less resource consuming data. Alternatively, if the parameters P-DMO define an undersized DMO channel, each terminal can refuse to access the direct mode communication.

If the message MA-DMO notifies that a DMO channel could not be set according to step E3, the terminals are not synchronized with each other and cannot directly communicate.

If the message MA-DMO comprises parameters P-DMO of a DMO channel which is undersized as compared to the quality of service parameters P-QoS transmitted, each terminal can decide not to access the direct mode communication via the undersized channel C-DMO and can notify it to the base station.

The message MA-DMO, comprising valuable or zero-value parameters P-DMO, cannot be broadcasted by the interface IRbs of the base station throughout the period of the DMO communication for other terminals of the DMO group which will be recorded at the base station BSn to be able to communicate in direct mode with the ongoing DMO group. For example, the terminal T8 illustrated in FIG. 1 belonging to the DMO group arrives in the cell Cn and is recorded at the base station BSn. After recording, the terminal T8 receives the MA-DMO allocation message via the downlink DMO control channel and accesses the ongoing DMO communication in the channel C-DMO.

During the DMO communication, one of the terminals of the group belonging to the cell Cn can transmit a request RQ-DMO to the base station BSn, as in step E1 to request a modification of the channel C-DMO, for example to increase or decrease the number of radio resources. The request comprises the identity ID-DMO and quality of service parameters P-QoS corresponding to the requested modification of the DMO channel. Upon receiving the request by the base station, steps E2 and the following ones of the method are reiterated.

Then in step E7, the DMO communication can go on as long as no Nt-END notification of end of communication of the group is transmitted to the base station BSn (N). Such a notification Nt-END can be transmitted by the terminal initiating the group communication via the uplink DMO control channel. The notification can also be transmitted by another terminal of the DMO group designated responsible for notifying the end of the DMO communication to the base station BSn through the uplink DMO control channel. The notification Nt-END received by the base station BSn comprises the identity ID-DMO of the DMO group the communication of which is finished.

Alternatively, the notification Nt-END can also be generated by the base station BSn itself at the end of the utilization period DUn of the DMO channel. In this case, the base station can transmit the notification Nt-END to the terminals of the group which are related to the cell Cn. The notification Nt-END can also be generated in each terminal of the group related to the base station at the end of the period DUn, when the period has been transmitted to said terminals.

According to another alternative, the notification Nt-END can also be generated by the base station as soon as all the terminals of the DMO group are no longer recorded at the base station BSn.

As soon as the notification Nt-END is received or generated by the base station BSn (Y), the base station releases in step E8 the resource blocks allocated to the channel C-DMO for other relayed or direct mode communications in the cell Cn.

Figure 5:
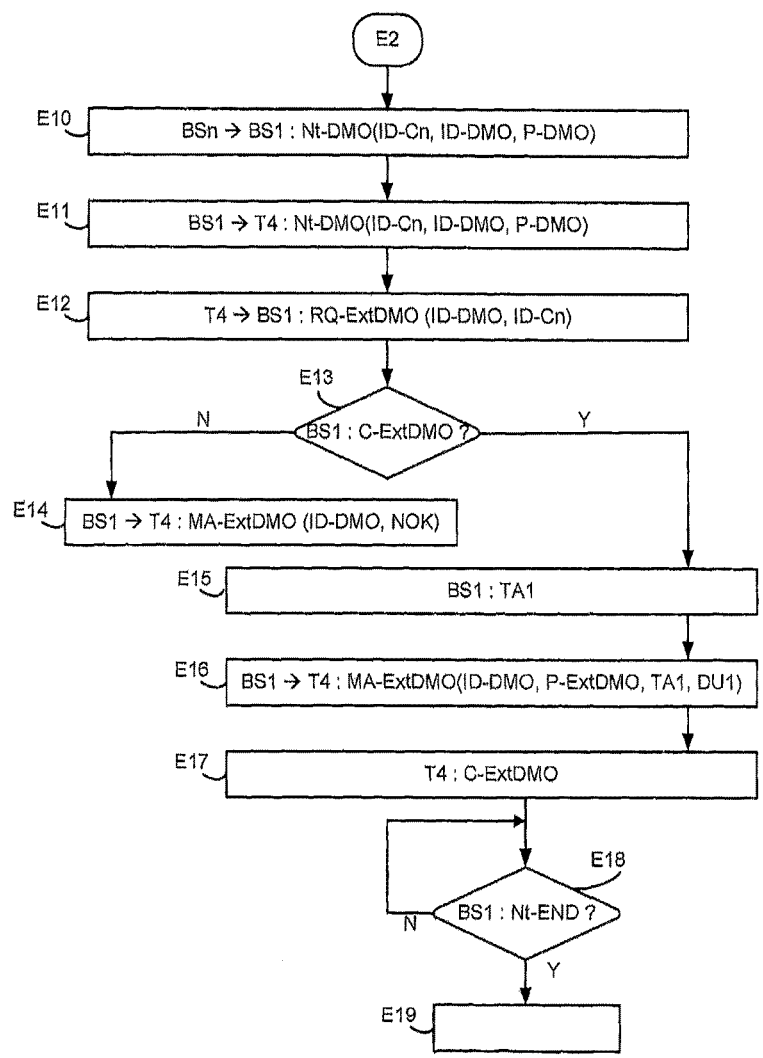
FIG. 5: a functional diagram of setting a direct mode communication extension in a neighbouring cell.

The functional diagram illustrated in FIG. 5 represents setting a channel extension C-ExtDMO of the c-DMO channel in a neighbouring cell when one of the terminals of the group is recorded in the neighbouring cell and the group communication is not set yet. In the following description, the cell Cn which has set the channel C-DMO will be called current cell. The channel extension C-ExtDMO set in a neighbouring cell should comprise the same resource blocks as the channel C-DMO set in the current cell so that the terminals of the group recorded in both cells can directly communicate with each other.

Steps E10 to E19 of FIG. 5 describe the setting of a channel extension C-ExtDMO of the channel C-DMO in the neighbouring cell C1 so that the terminal T4 of the DMO group can directly communicate with the terminals of the group Tm, T1, T2 and T5 recorded in the current cell Cn. The functional diagram of FIG. 5 starts in step E2 of the functional diagram of FIG. 4.

As soon as the module Md-ALDMO of the station BSn has set the channel C-DMO in step E2, the interface IFBs of the current station BSn transmits a notification Nt-DMO of setting a channel C-DMO in step E10. The notification Nt-DMO is transmitted to the base stations of the neighbouring cells, such as the base station BS1 of the cell C1 and the base station BS2 of the cell C2 represented in FIG. 1. The notification Nt-DMO comprises the identity ID-DMO of the group, the parameters P-DMO of the channel C-DMO. The notification can also comprise the timing advance value TAn and the period DUn determined by the base station. The notification can also comprise an identity ID-Cn of the cell Cn wherein the DMO communication has been initiated.

During any modification of the channel C-DMO required by one of the terminals Tm, T1, T2 or T5, the current base station BSn can transmit to the neighbouring base stations a notification Nt-DMO comprising the new parameters P-DMO of the channel C-DMO.

In step E11, the interface IFbs of the neighbouring base station BS1 receives the notification Nt-DMO and the interface IRbs of the base station broadcasts it to the different terminals which are related to the cell C1. The broadcasting of the notification Nt-DMO is forwarded in the downlink DMO control channel of the cell C1. Only the terminals belonging to the ID-DMO group can access the notification Nt-DMO.

In step E12, the interface IRt of each terminal member of the DMO group and related to the cell C1, in the example the terminal T4, receives the notification Nt-DMO. To access the DMO communication, one of the terminals, in the example the terminal T4, transmits a request RQ-ExtDMO for setting a channel extension to the base station BS1. The request RQ-ExtDMO is transmitted to the uplink DMO control channel of the cell C1. The request RQ-ExtDMO includes the identity of the ID-DMO group and can also include the identity ID-Cn of the cell Cn wherein the DMO communication has been initiated. When several terminals members of the group are related to the cell C1, one of the terminals can be designated to request the setting of a channel extension of the DMO channel. Alternatively, this is the first request RQ-ExtDMO received by the base station BS1 which is processed by the station BS1.

In step E13, the allocation module Md-ALDMO of the base station BS1 checks whether it can allocate the same resource blocks as those allocated in the cell Cn in order to form the channel extension C-ExtDMO of the channel C-DMO. For that, the module Md-ALDMO of the station BS1 checks that the resource blocks identical to those allocated by BSn are free. The channel extension C-Ext-DMO to be set in the cell C1 should comprise the same resource blocks as the channel C-DMO set in the current cell so that the terminals of the group which are recorded in both cells can directly communicate with each other.

If in step E13, the number of resource blocks is not enough to set a channel extension C-ExtDMO of the C-DMO (N) channel, the base station BS1 notifies in step E14, to the terminal T4 the impossibility of setting a channel extension. The interface IRbs of the station BS1 broadcasts to all the terminals related to the cell C1 a MA-ExtDMO message of setting an extension. The message is broadcasted through the downlink DMO control channel of the cell C1. The MA-ExtDMO message contains the identity of the ID-DMO group and indicates that the C-ExtDMO extension cannot be set NOK. Alternatively, to notify that the C-Ext-DMO extension could not be set, the base station transmits the identity ID-DMO and the parameters P-ExtDMO of setting a zero-value channel extension. Only the terminals related to the cell C1 and belonging to the ID-DMO group, in the example the terminal T4, can access the MA-ExtDMO message.

The terminal T4, if it is close to the cell Cn, can be derecorded from the base station BS1 and be recorded at the base station BSn in order to access the ongoing DMO communication in the cell Cn from the channel C-DMO.

If in step E13, the number of resource blocks is enough to set a channel extension C-ExtDMO of the C-DMO (Y) channel, the base station BS1 allocates them to set the channel extension C-ExtDMO in the cell C1. Then in step E15, the module Md-TA of the base station BS1 determines a timing advance value TAn as a function of the time data from the terminal(s) of the DMO group which are recorded at the base station BS1. The module Md-TA can compare the timing advance value TA1 to the timing advance value TAn. The difference between both values TA1 and TAn varies as a function of the size of the cells C1 and Cn. If the difference in the timing advance value is significant between the cells C1 and Cn, there can be a direct mode communication collision in the channel and the channel extension. Indeed, if TA1 is small as compared to TAn, the terminals of the group which are recorded at the station BS1 will not disturb each other in their direct exchanges via the channel extension in C1, but they can interfere on transport channels allocated to other communications in the cell Cn. In this case, the station BS1 can refuse to set the channel extension C-ExtDMO. According to another alternative, to overcome too significant a timing advance value difference between two cells, an operating rule of the resource blocks can be forced on the terminals of the group which are related to either cell. This rule can force the terminals of the group which are related to the cell having the smallest size having a smaller timing advance value not to use the last symbol(s) of the resource blocks allocated to the channel C-DMO or its C-ExtDMO extension in said cell. Or according to another alternative, this rule can force the terminals of the group which are related to the cell having the greatest size having a greater timing advance value not to use the first symbol(s) of the resource blocks allocated to the channel C-DMO or its C-ExtDMO extension in said cell. The base station BS1 can force the terminals of the group which are recorded at the same one of the previous operating rules of the resource blocks with respect to the size of the cell Cn. Or, according to an alternative, the base station BS1 can inform the base station BSn, of the greatest difference in timing advance value and it is the base station BSn that can force one of the previous operating rules of the resource blocks on the terminals of the group which are recorded at the same. Then in step E16, when the channel extension C-ExtDMO is set, when the timing advance value is determined and when a possible operating rule of the resource blocks of the extension is applied, the interface IRbs of the base station BS1 broadcasts to all the terminals related to the cell Cn a MA-ExtDMO message of setting a channel extension C-ExtDMO. Only the terminals related to the cell C1 and belonging to the ID-DMO group, in the example the terminal T4, can access the MA-ExtDMO message. The MA-ExtDMO message comprises the identity of the ID-DMO group, the parameters P-ExtDMO of the channel extension C-ExtDMO and the timing advance value TA1. The MA-ExtDMO message can also comprise an operating rule of the resource blocks allocated to set the channel extension C-Ext-DMO. The MA-ExtDMO message can also comprise a utilization period DU1 of the channel extension C-ExtDMO determined by the base station SB1 as a function of the availability time of the resource blocks allocated for said channel extension C-ExtDMO in C1. This period DU1 can be different from the period DUn. Indeed, the resource blocks can be free for some period in the cell C1 then occupied by other relayed or direct mode priority communications in the same cell C1 before the period DuN relating to the cell Cn is wholly elapsed.

Then in step E17, the interface IRt of each terminal of the group of the cell C1, in the example T4, receives the MA-ExtDMO message. The module Md-DMO of the terminal T4 then applies the parameters P-ExtDMO in order to access the C-ExtDMO extension and to directly communicate with the other terminals of the group lying in the cell C1 and the other neighbouring cells having set either the channel C-DMO, or a channel extension C-ExtDMO. The module Md-DMO of each terminal also applies the timing advance value TA1 so that each terminal of the group recorded at the cell C1 can synchronized with the resource blocks allocated to the channel extension C-ExtDMO. The module Md-DMO of each terminal can also apply an operating rule of the resource blocks which is present in the MA-ExtDMO message.

The MA-ExtDMO message can be broadcasted by the base station BS1 throughout the duration of the DMO communication so that other terminals of the DMO group which will be recorded at the base station SB1 can communicate in direct mode with the ongoing DMO group.

Then in step E18, the channel extension C-ExtDMO is maintained set as long as no notification Nt-END of end of communication of the group is transmitted to the base station BS1 (N). This notification Nt-END can be transmitted by a terminal of the group related to the cell C1 and designated responsible for notifying the DMO end communication to the base station BS1. In this case, the notification is transmitted via the uplink DMO control channel. The notification Nt-END can also be transmitted to the base station BS1 by the base station BSn when the latter has received the notification Nt-END in step E6 illustrated in FIG. 4. The notification Nt-END can also be transmitted to the station BS1 by another neighbouring station which has set a channel extension C-ExtDMO and which has received a notification Nt-END of one of the terminals of the group related to said neighbouring cell. Alternatively, the notification Nt-END can be generated by the base station BS1 at the end of the period DU1.

As soon as the base station SB1 receives the Nt-END (Y) notification, it releases in step E19 the resource blocks allocated to the channel extension C-ExtDMO for other relayed or direct mode communications in the cell C1.

When the base station BS1 receives an end of communication notification from one of the terminals of the group related to the cell C1, the base station BS1 can transmit said notification to the base station BSn for the same to take it into account in step E6 of FIG. 4. The base station BS1 can also transmit said notification to the neighbouring base stations to properly close the channel C-DMO and the C-ExtDMO extensions.

During the DMO communication in the cell C1, the station BSn can notify to the station BS1 that a modification in the channel C-DMO in the cell Cn has occurred. The station BSn can transmit a notification Nt-DMO identical to the one transmitted in step E10. Upon receiving the notification and depending on the availability of the resource blocks, the base station BS1 can modify or not the channel extension C-ExtDMO in the cell C1 as indicated in step E13. Then steps E14 or E15 to E19 are carried out.

According to an alternative embodiment of executing the method steps illustrated in FIG. 4, returning to step E12, after receiving the notification Nt-DMO, the terminal T4, if it is close to the cell Cn, can be derecorded from the base station BS1 and be recorded at the base station BSn in order to access the ongoing DMO communication in the cell Cn. In this case, the station BS1 only transmits the information that a DMO communication is in progress in the cell Cn. After recording at the station BSn, the terminal T4 receives, in step E5 (FIG. 4) the MA-DMO allocation message via the downlink DMO control channel of the cell Cn and accesses the ongoing DMO communication. In this alternative, steps E13 to E19 are not carried out.

According to an alternative embodiment of carrying out the method steps illustrated in FIG. 4, as soon as the base station BS1 has received the notification Nt-DMO in step E10, it considers the notification as a request for setting a channel extension and it attempts to directly allocate resource blocks to set the channel extension C-ExtDMO in step E13. Then, steps E14 or E15 to E19 are carried out. In this alternative, steps E11 and E12 are not carried out.

Figure 6:
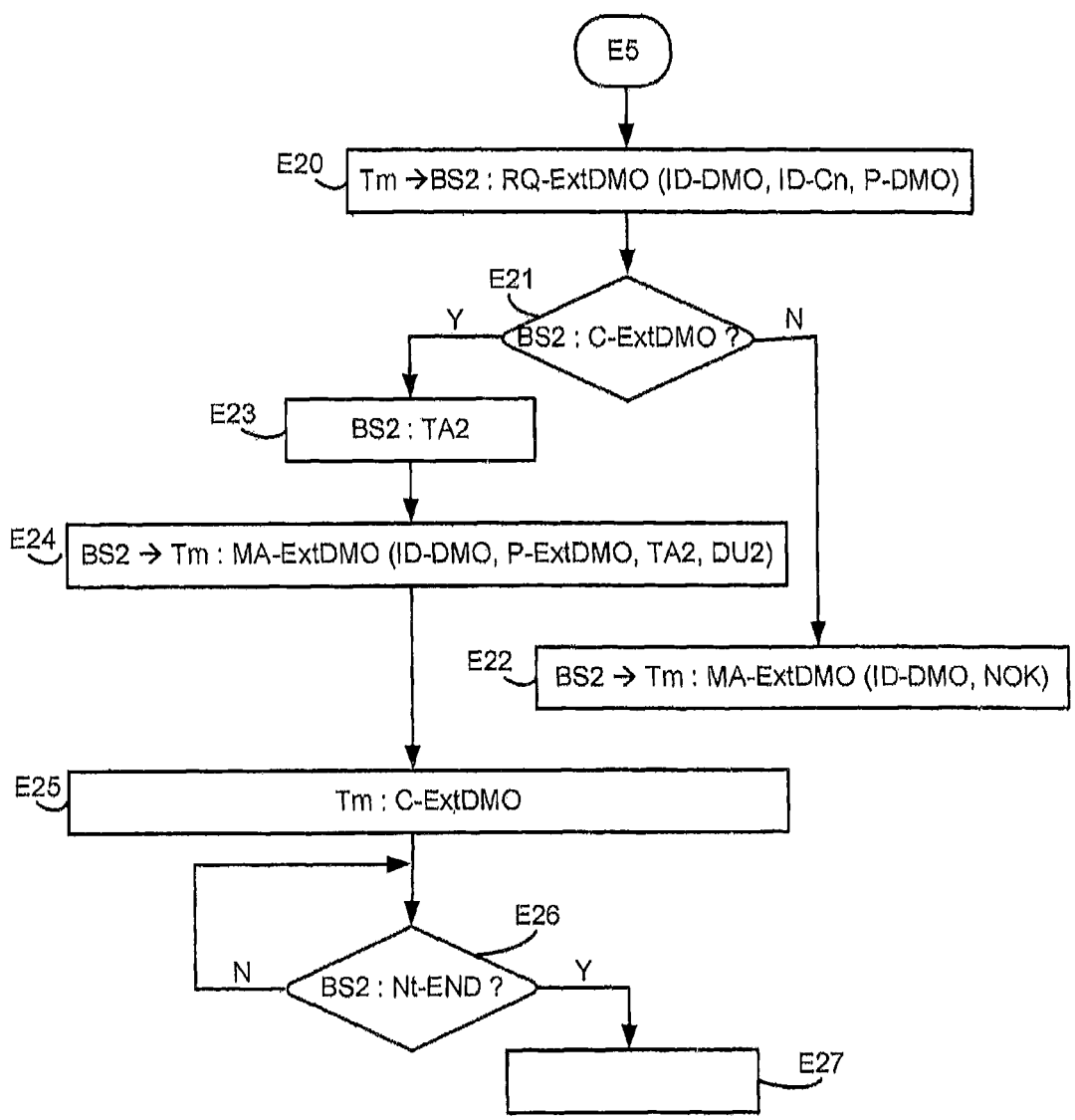
FIG. 6: a functional diagram representing a first embodiment of setting a direct mode communication extension in a neighbouring cell when a terminal moves from a first cell to the neighbouring cell.

The functional diagrams illustrated in FIG. 6 and represent two alternative embodiments of setting a channel extension C-ExtDMO of the channel C-DMO in a neighbouring cell during a movement of the DMO group or part of the DMO group to a neighbouring cell. In both embodiments, the neighbouring cell has not yet set the channel extension C-ExtDMO of the channel C-DMO. More particularly, according to the example proposed, both embodiments describe the setting of a channel extension C-ExtDMO of the channel C-DMO in the neighbouring cell C2 of the current cell Cn by the terminal Tm, during a movement of the DMO group or part of the DMO group from the current cell Cn to the cell C2. During a DMO communication in the cell Cn, the terminal Tm moves and goes away from the base station BSn to move closer to the base station BS2. The radio signals received by the terminal from the station BSn are lower than those from the station BS2. The terminal thus must perform a cell change and require a channel C-DMO extension in the new cell so as not to exit from the DMO communication. In the example, Tm can be one of the first terminals of the group which is related to the cell C2 and thus which requests setting the channel extension. Alternatively, Tm can be the terminal of the DMO group, designated to request setting of the channel C-DMO or an extension of the channel C-DMO by the ID-DMO group.

Steps E20 to E27 of FIG. 6 describe a first embodiment of setting the channel extension of the channel C-DMO in the neighbouring cell C2 after the moving terminal Tm has been recorded at the station C2. The functional diagram of FIG. 6 starts at step E5 of the functional diagram of FIG. 4.

During a DMO communication in the current cell Cn, the terminal Tm moves and goes away from the base station BSn to move closer to the base station BS2. The terminal Tm is derecorded from the station BSn and is recorded at the station BS2. Then, in step E20, as soon as the recording is performed, the interface IRt of the terminal Tm transmits to the station BS2 via the uplink DMO control channel of the cell C2 a request of setting a channel extension RQ-ExtDMO of the channel C-DMO. The request comprises the identity ID-DMO of the group, the parameters P-DMO of the channel C-DMO set in the current cell Cn. The request can also comprise the identity ID-Cn of the cell Cn wherein the channel C-DMO is set.

Then in step E21, the interface IRbs of the station BS2 receives the request RQ-ExtDMO. The allocation module Md-ALDMO of the base station BS2 checks whether it can allocate the same resource blocks as those allocated in the current cell Cn to set the channel extension C-ExtDMO of the channel C-DMO. For this, the module Md-ALDMO of the station BS2 checks that the resource blocks identical to those allocated by the station BSn are free. The channel extension C-ExtDMO to be set in the cell C2 must comprise the same resource blocks as the channel C-DMO set in the current cell so that the terminals of the group recorded in both cells can communicate directly with each other.

If in step E13, the number of resource blocks is not enough to form a channel extension C-ExtDMO of the C-DMO (N) channel, the base station BS2 notifies in step E22, to the terminal Tm of the impossibility of setting an extension of the channel C-DMO. The interface IRBs of the station BS2 broadcasts to all terminals related to the cell C2 a MA-ExtDMO message. The message is broadcasted through the downlink DMO control channel of the cell C2. The MA-ExtDMO message comprises the identity of the ID-DMO group and could comprise a NOK information indicating that the channel expansion cannot be set. Alternatively, to notify that the channel extension could not be set, the base Station transmits the identity ID-DMO and parameters P-ExtDMO of a zero-value channel extension. Only the terminals related to the cell C2 and belonging to the ID-DMO group, in the example the terminal Tm, can access the MA-ExtDMO message.

The terminal Tm, if it is close to the cell Cn, can be derecorded from the base station BS2 and be recorded at the base station BSn in order to access again the ongoing DMO communication via the channel C-DMO.

If in step E21, the number of resource blocks is enough to set a channel extension C-ExtDMO of the C-DMO (Y) channel, the base station BS2 allocates them to set the channel extension C-ExtDMO in the cell C2. Then in step E33, the module Md-TA of the base station BS2 determines a timing advance value TA2 as a function of time data from one or more terminals of the DMO group which are recorded at the base station BS2. As explained in step E15 of FIG. 5, the value difference between TAn and TA2 can be significant and implies either not to set the channel extension in the cell C2, or to force either cell to use an operating rule of the resource blocks allocated to set the channel extension.

Then in step E24, when the channel extension C-ExtDMO is set, that the timing advance value TA2 is determined and that a possible operating rule of the resource blocks of the extension is applied, the interface IRbs of the base station BS2 broadcasts to all the terminals related to the cell C2, an MA-ExtDMO message of setting a channel extension C-ExtDMO. Only the terminals belonging to the ID-DMO group, in the example the terminal Tm, can access the MA-ExtDMO message. The MA-ExtDMO message comprises the identity of the ID-DMO group, the parameters P-ExtDMO of the channel extension C-ExtDMO and the timing advance value TA2. The MA-ExtDMO message can also comprise, if need be, the operating rule of the resource blocks. The MA-ExtDMO message can also comprise a utilization period DU2 of the channel extension C-ExtDMO determined by the base station SB2 as a function the availability time of the resource blocks allocated for the channel extension C-ExtDMO in C2. This period DU2 can be different from the period DUn or the period DU1.

Then in step E25, the interface IRt of each terminal of the group of the cell C2, in the example Tm, receives the MA-ExtDMO allocation message. The module Md-DMO of the terminal Tm then applies the parameters P-ExtDMO in order to access the C-ExtDMO extension and to directly communicate with the other terminals of the group lying in the cell C2 and in the other neighbouring cells having set either the channel C-DMO, or a channel extension C-ExtDMO. The module Md-DMO of each terminal also applies the timing advance value TA2 so that each terminal of the group recorded at the cell C2 can be synchronized with the resource blocks allocated to the channel extension C-ExtDMO. The module Md-DMO of each terminal can also apply an operating rule of the resource blocks which is present in the MA-ExtDMO message.

The MA-ExtDMO message can be broadcasted by the base station BS2 throughout the period of the DMO communication so that other terminals of the group which will be recorded at the base station SB2 can communicate in direct mode with the ongoing DMO group via the channel C-DMO and the channel extension C-ExtDMO.

Then in step E26, the channel extension C-ExtDMO is kept set as long as no notification Nt-END of end of communication of the group is transmitted to the base Station BS2 (N). The notification Nt-END is transmitted to or generated by the base station BS2 in an identical way to the notification of end of communication in the base station BS1 in step E18.

As soon as the base station BS2 receives the Nt-END (Y) notification, it releases in step E27 the allocated resource blocks to set the channel extension C-ExtDMO of the channel C-DMO for other relayed or direct mode communications in the cell C2.

Steps E30 to E42 of FIG. 7 describe a second embodiment of setting a channel extension of the channel C-DMO in the neighbouring cell C2 before the moving terminal Tm is recorded at the station BS2. The functional diagram of FIG. 7 starts in step E5 of the functional diagram of FIG. 4.

During the DMO communication in the current cell Cn, the terminal Tm moves and goes away from the base station BSn to move closer to the base station BS2. The terminal must perform a cell change and request a terminal extension of the channel C-DMO in the cell C2 so as not to exit from the DMO communication. For this, in step E30, the module Md-DMO of the terminal Tm forms a request RQ-ExtDMO of setting a channel extension. The interface IRt of the terminal Tm transmits to the current base station BSn the request RQ-ExtDMO through the uplink DMO control channel. The request RQ-ExtDMO comprises at least the identity ID-DMO of the DMO group. The request RQ-ExtDMO can also comprise the identity ID-C2 of the cell C2 wherein a channel extension is requested.

Then in step E31, the interface IFbs of the base station BSn retransmits the request RQ-ExtDMO to the base station of the cell C2. The cell C2 can be identified by the station BSn as a function of the identity ID-C2 present in the request RQ-ExtDMO. Alternatively, the base station broadcasts to all the neighbouring stations the request RQ-ExtDMO. Only the base station of the cell the identity of which is ID-C2, which identity is present in the request, processes the request.

Upon receiving the RQ-ExtDMO, in step E32 which is carried out in an identical way to step E21, the allocation module Md-ALDMO of the base station BS2 checks whether it can allocate resource blocks relating to the parameters P-DMO included in the request to set the channel extension C-ExtDMO of the channel C-DMO.

If in step E32, the number of resource blocks is not enough to set a channel extension of the C-DMO (N) channel, the base station BS2 transmits to the current base station BSn a notification Nt-ExtDMO in step E33. The notification Nt-ExtDMO comprises the identity of the ID-DMO group, and a NOK information indicating that the channel extension cannot be set. The notification can also contain the identity ID-C2 of the cell C2. Alternatively, to notify that the channel C-DMO extension could not be set, the base station transmits the identity ID-DMO and parameters P-ExtDMO of a zero-value channel extension.

Then in step E34, the base station BSn retransmits the notification Nt-DMO to the terminal Tm.

If in step E32, the number of resource blocks is enough to set a channel extension of the C-DMO (Y) channel, the base station BS2 allocates them to set the C-ExtDMO extension channel of the channel C-DMO in the cell C2. Then in step E35, the base station BS2 transmits to the base station BSn, a notification Nt-ExtDMO comprising the identity of the ID-DMO group, and an OK information indicating that the channel extension C-ExtDMO is set. The notification Nt-ExtDMO can also contain the identity ID-C2 of the cell C2. Upon receiving the notification Nt-ExtDMO, the base station BSn retransmits the notification Nt-ExtDMO to the terminal Tm, in step E36. Upon receiving the notification indicating that the channel extension C-ExtDMO is set in the cell C2, the terminal C2 is derecorded from the base station BSn to be recorded at the base station BS2.

Then in step E37, after actual recording of the terminal Tm at the base station BS2, the module Md-TA of the base station BS2 determines a timing advance value TA2. Steps 37 to 41 are identical to steps 23 to 27 of the first embodiment illustrated in FIG. 6.

Depending on the availability of the resource block's allocated to a cell, a base station can allocate one or more channel C-DMOs or a channel extension C-ExtDMO respectively for several different DMO communication groups acting in the cell. In this case, the uplink DMO control channel and the downlink DMO control channel in each cell enable the messages and notifications to be forwarded into the base station and the terminals of the different DMO groups. The messages and notifications are differentiated by the identity ID-DMO of the group included therein.

In the following description, several embodiments of determining the timing advance value TA, previously called TAn, TA1, TA2 and determined for each base station of the radiocommunication system are set forth.

The timing advance value is determined by the module Md-TA of each base station as a function of time data from one or more terminals of the DMO group which are related to the base station. Each time datum corresponds to a fixed instant value produced by each terminal at each transmission of a message from the terminal to the base station. The fixed instant value can be emitted in a request RQ-DMO, RQ-ExtDMO, upon recording the terminal at the base station or requesting the base station. Once it is determined, the value TA is transmitted to all the terminals recorded at the base station. The terminals use the value TA to improve the transmission thereof and avoid any collision with other communications managed by the base station and contained in resource blocks adjacent to resource blocks allocated for the required DMO communication.

According to a first embodiment, the module Md-TA determines the timing advance value from the fixed instant value produced by the first terminal initiating the DMO communication. More particularly, the module Md-TA measures the offset time between the start instant of the request corresponding to the fixed instant value and the arrival instant of the request RQ-DMO at the base station. The module Md-TA thus assesses the round-trip propagation time between the terminal and the base station. This propagation time corresponds to the timing advance value TA. The timing advance value can be periodically determined. For example, when the base station receives from or requests a new fixed instant value to the transmitting terminal. According to this first embodiment, the other terminals of the DMO group are assumed to be close to the terminal transmitting the request, this is the reason why all the terminals of the DMO group receive the determined value TA. In this first embodiment, the determination of the timing advance value TA is not optimum since it is only determined from a single fixed instant value of the transmitting terminal of the DMO group.

According to a second embodiment, the module Md-TA determines the timing advance value TA from all the fixed instant values produced respectively by all the terminals of the DMO group which are recorded at the base station. Upon periodically or not recording each terminal at the base station, the base station determines a timing advance value peculiar to said terminal. Then, the module Md-TA determines the average timing advance value as a function of all the timing advance values peculiar to each terminal of the group recorded at the base station. The value TA is broadcasted to all the terminals of the DMO group which are recorded to the base station.

Alternatively, the time datum is deduced by the module Md-TA from a direct control of the channel C-DMO or the extension of this channel allocated to the DMO communication. The base station analyses all the DMO communications exchanged between the terminals of the group and determines the timing advance value of each exchange. For example in LTE technology, the base station observes the reference signals RS included in each direct transmission from a transmitting terminal. Then the base station compares them to the reference signals RS of the resource blocks dedicated to the channel C-DMO or its channel extension to check for existence of a time drift. The timing advance value is determined to readjust the time drift.

The module Md-TA can apply an operating rule of the resource blocks of a DMO channel enabling to ensure that there will not be an interference between the resource blocks which is due to a non-optimum timing advance value TA associated to the DMO channel. This rule is useful when the DMO channel is fragmented into non-contiguous resource blocks on the time axis. The rule consists in that each first and each last OFDM symbol of each radio block being contiguous to a radio block not belonging to the DMO channel of the ID-DMO group should not be used. The rule should be known to all the terminals able to communicate in direct mode.

The invention claimed is:

1. A method for setting a direct mode communication for terminals of a given direct mode communication group in at least one current cell of a wide band radiocommunication system comprising a plurality of cells, each cell of the wide band radiocommunication system comprising a base station, the method comprising:
   transmitting a request for setting a direct mode communication channel to a current base station of a current cell by a terminal of the direct mode communication group recorded at said base station, the request comprising an identity of the direct mode communication group and quality of service parameters specific to the requested direct mode communication channel;
   after receiving the request by the current base station, setting a direct mode communication channel by allocating free resource blocks selected from a set of resource blocks allocated to the current cell, as a function of the quality of service parameters;
   transmitting a channel setting message, transmitted by the current base station to the terminals recorded at said current base station, the message comprising the identity of the direct mode communication group and setting parameters of the set channel, and
   after receiving the setting message by the terminals of the group which are recorded at the current base station, accessing the direct mode communication channel by each of said terminals from the setting parameters transmitted for directly communicating with the other terminals of the group, wherein the set direct mode communication channel is undersized if a number of the allocated resource blocks does not correspond to the requested quality of service parameters.

2. The method according to claim 1, comprising after setting the direct mode communication channel:
   determining a timing advance value by the current base station as a function of at least one time datum, and
   transmitting the timing advance value determined via the channel setting message of a direct mode communication channel to the terminals of the direct mode communication group which are recorded at the current base station for said terminals to be synchronized with each other.

3. The method according to claim 2, wherein the at least one time datum is a fixed instant value produced by at least one terminal of the direct mode communication group, recorded at the current base station, and is transmitted to the current base station.

4. The method according to claim 2, wherein the timing advance value corresponds to an average of the timing advance values each determined for each terminal of the direct mode communication group, recorded at the base station.

5. The method according to claim 2, wherein the at least one time datum is contained in the set direct mode communication channel and is measured by the current base station.

6. The method according to claim 1, wherein the terminals recorded at said current base station transmit less resource consuming data or refuse to access the set direct mode communication channel if the set direct mode communication channel is undersized.

7. The method according to claim 1, wherein the current base station releases the resource blocks allocated for the direct mode communication channel upon receiving a direct mode end of communication notification from a terminal of a group recorded at the current base station or upon generating an end communication notification by the current base station at an end of a utilization period.

8. The method according to claim 1, further comprising after setting the direct mode communication channel in the current cell, transmitting a request for setting a channel extension of the direct mode communication channel to at least one neighbouring base station of a neighbouring cell.

9. The method according to claim 8, wherein the request for setting a channel extension is transmitted by the current base station and comprises the setting parameters of the direct mode communication channel.

10. The method according to claim 8, wherein the request for setting a channel extension is transmitted by a terminal of the direct mode communication group which has been derecorded from the current base station and has been recorded at the neighbouring base station, the request for setting a channel extension comprising the setting parameters of said direct mode communication channel.

11. The method according to claim 8, further comprising after setting the direct mode communication channel:
transmitting a setting notification of said direct mode communication channel by the current base station to the neighbouring base station, the notification comprising the setting parameters of said direct mode communication channel,
broadcasting said notification to terminals recorded at said neighbouring base station so that, among one of the terminals, a terminal of the direct mode communication group transmits the setting request of a channel extension to the neighbouring base station.

12. The method according to claim 8, further comprising, in the neighbouring base station and after receiving the request for setting a channel extension:
setting a channel extension of the direct mode communication channel by allocating free resource blocks selected from a set of resource blocks allocated to the neighbouring cell, as a function of the setting parameters of the direct mode communication channel,
transmitting a setting message of a channel extension, from the neighbouring base station to terminals recorded at said base station, the message comprising the identity of the group and setting parameters of the channel extension, and
after receiving the setting message of a channel extension by the terminals of the group, recorded at the neighbouring base station, accessing the channel extension of the direct mode communication channel (C-DMO) by each of said terminals from the setting parameters of the channel extension for directly communicating with said terminals of the group.

13. The method according to claim 12, further comprising, after receiving the request for setting the channel extension:
determining a timing advance value by the neighbouring base station as a function of at least one time datum, and
transmitting the timing advance value determined via the setting message of an extension to the terminals of the group recorded at the neighbouring base station for said terminals to be synchronized with each other.

14. The method according to claim 13, wherein after determining a timing advance value by a neighbouring base station, if a difference of the timing advance values respectively determined by the current base station and the neighbouring base station is significant, the neighbouring base station does not set the channel extension.

15. The method according to claim 13, wherein after determining a timing advance value by a neighbouring base station, if a difference of the timing advance values respectively determined by the current base station and the neighbouring base station is significant, at least one of both base stations forces on the terminals of the group which are recorded at the same, an operating rule specifying not to use some symbols of the resource blocks allocated to set the channel or channel extension.

16. The method according to claim 1, wherein the base station is configured to force on the terminals of the direct mode communication group which are recorded at the same an operating rule specifying that each first and each last symbol of each resource block allocated to set the direct mode communication channel and being contiguous to a resource block non-allocated to set the direct mode communication channel is not to be used.

17. The method according to claim 1, wherein the transmitting of a request for setting a direct mode communication channel or a request for setting a channel extension is made through an uplink control channel dedicated to direct mode communication from a terminal of the direct mode communication group, recorded at a base station of the radiocommunication system to said base station.

18. The method according to claim 1, wherein the transmitting of a message for setting a direct mode communication channel or a message for setting a channel extension is made through a downlink control channel dedicated to direct mode communication from a base station of the radiocommunication system to the terminals of the direct mode communication group, recorded at said base station.

19. A base station of a cell of a wide band radiocommunication system, the wide band radiocommunication system comprising a plurality of cells each comprising a base station, and at least one terminal of a given direct mode communication group being recorded at the base station, the base station comprising:
a means for receiving a request for setting a direct mode communication channel transmitted by the terminal at the base station, the request comprising an identity of the group and quality of service parameters specific to the requested direct mode communication channel,
a means for setting a direct mode communication channel by allocating free resource blocks selected from a set of resource blocks allocated to the cell, as a function of the quality of service parameters,
a means for transmitting a setting message of the channel to the terminals recorded at the base station, the message comprising the identity of the direct mode communication group and setting parameters of the channel formed, the message being transmitted for each terminal of the direct mode communication group recorded at the base station to access the direct mode communication channel from the setting parameters for directly communicating with said other terminals of the direct mode communication group,
wherein the set direct mode communication channel is undersized if a number of the allocated resource blocks does not correspond to the requested quality of service parameters.

20. A terminal belonging to a given direct mode communication group and recorded at a base station of a cell of a wide band radiocommunication system, the wide band radiocommunication system comprising a plurality of cells each comprising a base station, the terminal comprising:
- a means for transmitting a request for setting a direct mode communication channel to the base station, the request comprising an identity of the direct mode communication group and quality of service parameters specific to the requested direct mode communication channel, the request being transmitted for the base station to set a direct mode communication channel by allocating free resource blocks selected from a set of resource blocks allocated to the current cell, as a function of the quality of service parameters,
- a means for receiving a setting message of the channel from the base station, the message comprising the identity of the group and setting parameters of the set channel, and
- a means for accessing the direct mode communication channel from the setting parameters transmitted for directly communicating with the other terminals of the direct mode communication group;
- wherein the set direct mode communication channel is undersized if a number of the allocated resource blocks does not correspond to the requested quality of service parameters.

21. A method for setting a direct mode communication for terminals of a given direct mode communication group in at least one current cell of a wide band radiocommunication system comprising a plurality of cells, each cell of the wide band radiocommunication system comprising a base station, the method comprising:
- transmitting a request for setting a direct mode communication channel to a current base station of a current cell by a terminal of the direct mode communication group recorded at said base station, the request comprising an identity of the direct mode communication group and quality of service parameters specific to the requested direct mode communication channel;
- after receiving the request by the current base station, setting a direct mode communication channel by allocating free resource blocks selected from a set of resource blocks allocated to the current cell, as a function of the quality of service parameters;
- transmitting a channel setting message, transmitted by the current base station to the terminals recorded at said current base station, the message comprising the identity of the direct mode communication group and setting parameters of the set channel; and
- after receiving the setting message by the terminals of the group which are recorded at the current base station, accessing the direct mode communication channel by each of said terminals from the setting parameters transmitted for directly communicating with the other terminals of the group,
- wherein the current base station releases the resource blocks allocated for the direct mode communication channel upon receiving a direct mode end of communication notification from a terminal of a group recorded at the current base station or upon generating an end communication notification by the current base station at an end of a utilization period.

22. A method for setting a direct mode communication for terminals of a given direct mode communication group in at least one current cell of a wide band radiocommunication system comprising a plurality of cells, each cell of the wide band radiocommunication system comprising a base station, the method comprising:
- transmitting a request for setting a direct mode communication channel to a current base station of a current cell by a terminal of the direct mode communication group recorded at said base station, the request comprising an identity of the direct mode communication group and quality of service parameters specific to the requested direct mode communication channel;
- after receiving the request by the current base station, setting a direct mode communication channel by allocating free resource blocks selected from a set of resource blocks allocated to the current cell, as a function of the quality of service parameters;
- transmitting a channel setting message, transmitted by the current base station to the terminals recorded at said current base station, the message comprising the identity of the direct mode communication group and setting parameters of the set channel; and
- after receiving the setting message by the terminals of the group which are recorded at the current base station, accessing the direct mode communication channel by each of said terminals from the setting parameters transmitted for directly communicating with the other terminals of the group,
- wherein the transmitting of a request for setting a direct mode communication channel or a request for setting a channel extension is made through an uplink control channel dedicated to direct mode communication from a terminal of the direct mode communication group, recorded at a base station of the radiocommunication system, to said base station, and/or
- wherein the transmitting of a message for setting a direct mode communication channel or a message for setting a channel extension is made through a downlink control channel dedicated to direct mode communication from a base station of the radiocommunication system to the terminals of the direct mode communication group, recorded at said base station.

* * * * *